Figure 1:
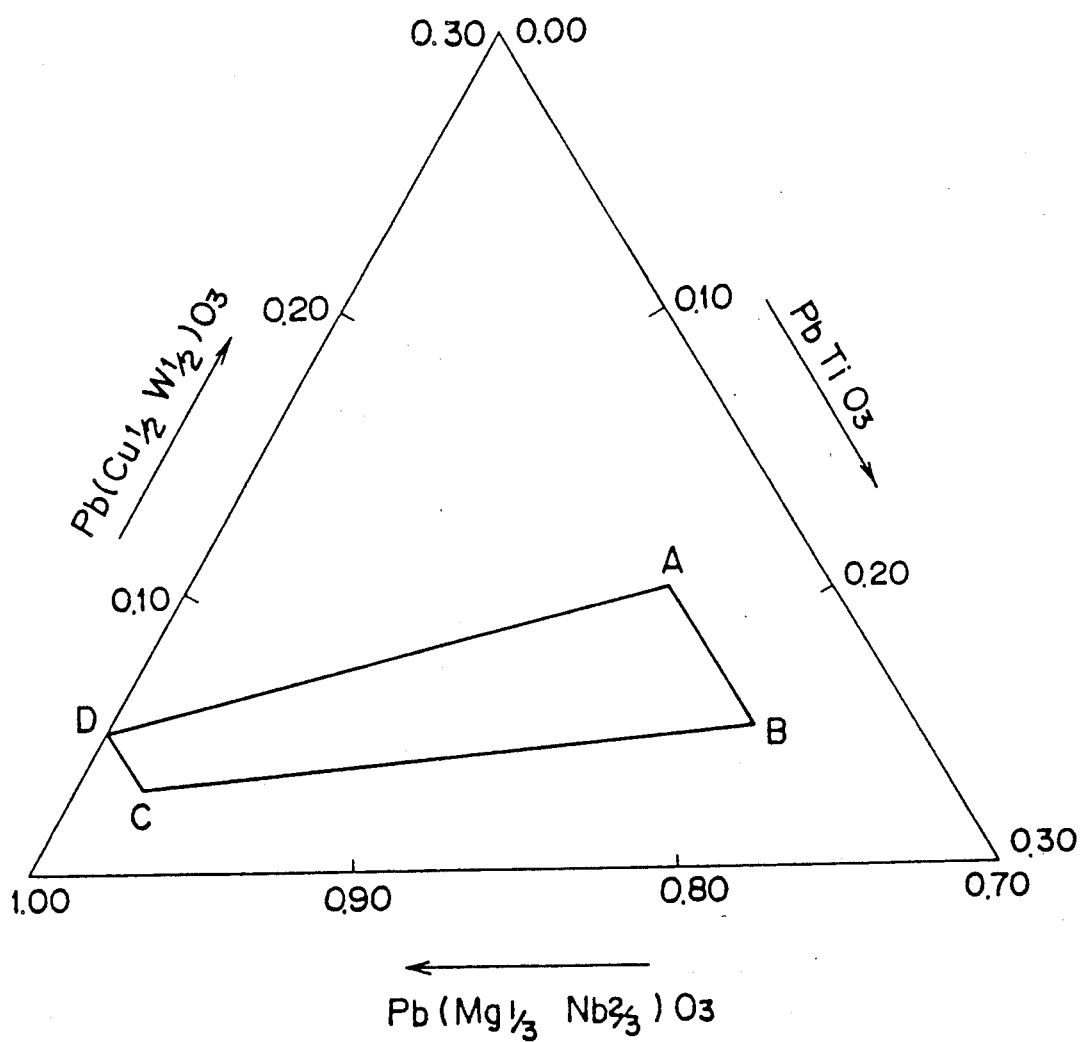

United States Patent

Morimoto et al.

Patent Number: 5,098,869
Date of Patent: Mar. 24, 1992

[54] DIELECTRIC CERAMIC COMPOSITION

[75] Inventors: Tadashi Morimoto; Norio Nakajima, both of Takefu; Harunobu Sano, Kyoto, all of Japan

[73] Assignee: Murata Manufacturing Co., Ltd., Japan

[21] Appl. No.: 583,601

[22] Filed: Sep. 17, 1990

[30] Foreign Application Priority Data

Sep. 18, 1989 [JP] Japan .................. 1-241584

[51] Int. Cl.$^5$ .................. C04B 35/49; C03C 14/00
[52] U.S. Cl. .................. 501/32; 501/136
[58] Field of Search .................. 501/32, 136

[56] References Cited

U.S. PATENT DOCUMENTS

| 4,450,240 | 5/1984 | Miyamoto et al. | 501/136 |
| 4,482,935 | 11/1984 | Wheeler | 501/136 |
| 4,525,768 | 6/1985 | Wheeler | 501/136 |
| 4,601,989 | 7/1986 | Sakabe et al. | 501/136 |

FOREIGN PATENT DOCUMENTS 55-51758  4/1980  Japan .................. 501/135

Primary Examiner—Mark L. Bell
Attorney, Agent, or Firm—Ostrolenk, Faber, Gerb & Soffen

[57] ABSTRACT

A dielectric ceramic composition consists essentially of a main component of a ternary system $Pb(Mg_{1/3}Nb_{2/3})O_3$—$Pb(Cu_{1/2}W_{1/2})O_3$—$PbTiO_3$, and contains a glass composition with a melting point of 600° to 900° C. in an amount of 0.5 to 1.5 parts by weight per 100 parts by weight of the main component. The main component has a composition represented by the general formula:

$$xPb(Mg_{1/3}Nb_{2/3})O_3 - yPb(Cu_{1/2}W_{1/2})O_3 - zPbTiO_3$$

wherein x, y and z are mol fractions of respective components and take a set of values falling within a polygon ABCD defined by points A, B, C and D in FIG. 1, and $x+y+z=1.00$. The set of x, y and z at each point is as follows:

|   | x | y | z |
|---|---|---|---|
| A | 0.75 | 0.10 | 0.15 |
| B | 0.75 | 0.05 | 0.20 |
| C | 0.95 | 0.03 | 0.02 |
| D | 0.95 | 0.05 | 0.00 |

1 Claim, 1 Drawing Sheet

DIELECTRIC CERAMIC COMPOSITION

BACKGROUND OF THE INVENTION

1. Field of the Invention

The present invention relates to a dielectric ceramic composition. More particularly, it relates to a ceramic composition useful as a dielectric material for small-sized, high capacitance multilayer tip capacitors.

2. Description of the Prior Art

So far, dielectric ceramic compositions mainly comprising $BaTiO_3$ have widely been used as a dielectric material for multilayer ceramic capacitors because of their high relative dielectric constant. However, such $BaTiO_3$ compositions have some disadvantages awaiting a solution. One of the disadvantages is that they have a high sintering temperature of not less than 1300° C. Thus, when producing multilayer capacitors, it is required to use noble metals such as Pt and Pd as a material for internal electrodes, resulting in high cost of production.

To this end, it has been proposed recently in a few patents to use a dielectric ceramic composition mainly comprising $PbTiO_3$ as a dielectric material for multi-layer ceramic capacitors. For example, Japanese patent laying-open No. 57-27974 discloses a composition of a system $Pb(Mg_{\frac{1}{3}}Nb_{\frac{2}{3}})O_3$—$Pb(Zn_{\frac{1}{3}}Nb_{\frac{2}{3}})O_3$—$PbTiO_3$, and Japanese patent laying-open No. 62-115608 discloses a composition of $Pb(Mg_{\frac{1}{3}}Nb_{\frac{2}{3}})O_3$—$Pb(Zn_{\frac{1}{3}}W_{\frac{1}{3}})O_3$—$PbTiO_3$. Also, it has been proposed to use a dielectric ceramic composition of a system $Pb(Fe_{\frac{2}{3}}W_{\frac{1}{3}})O_3$—$Pb(Fe_{\frac{1}{2}}Nb_{\frac{1}{2}})O_3$—$PbTiO_3$.

Such $PbTiO_3$-based ceramic compositions have a high relative dielectric constant ranging from 10000 to 15000 and a low sintering temperature of about 1000° C., thus making it possible to use relatively low-cost silver alloys such as Ag-Pd alloys as an internal electrode material for multi-layer ceramic capacitors.

However, these ceramic compositions are poor in resistance to plating because of a low redox potential of Pb contained therein, thus making it difficult to use them as a dielectric material for surface-mounting capacitive elements. Because, when producing capacitors for surface mounting, it is required to form an electrode layer of Ni, Sn or Sn-Pb alloy by electro-plating. During electroplating on capacitor units or chips, reduction of lead (Pb) takes place on the surface of the capacitor unit to give conductivity to the chip surface, resulting in short-circuiting of the electrodes due to development of a plated metal. Also, it causes failure in appearance and lowers the Q factor and insulating resistance of the product.

SUMMARY OF THE INVENTION

It is therefore a main object of the present invention to provide a dielectric ceramic composition which possesses high resistance to redox reactions during electroplating and which has a high relative dielectric constant of not less than 15000, a low sintering temperature of not more than 1000° C., and high volume resistance at room temperature and high temperatures.

The above and other objects of the present invention are achieved by providing a dielectric ceramic composition consisting essentially of a main component of a ternary system $Pb(Mg_{\frac{1}{3}}Nb_{\frac{2}{3}})O_3$—$Pb(Cu_{\frac{1}{2}}W_{\frac{1}{2}})O_3$—$PbTiO_3$, and containing, as a sub-component, a glass composition with a melting point of 600° to 900° C. in an amount of 0.5 to 1.5 parts by weight per 100 parts by weight of said main component, said main component having a composition represented by the general formula:

$$xPb(Mg_{\frac{1}{3}}Nb_{\frac{2}{3}})O_3 - yPb(Cu_{\frac{1}{2}}W_{\frac{1}{2}})O_3 - zPbTiO_3$$

wherein x, y and z are mol fractions of respective components and take a set of values falling within a polygon ABCD defined by points A, B, C and D in FIG. 1, and $x+y+z=1.00$, the set of x, y and z at said each point being as follows:

|   | x    | y    | z    |
|---|------|------|------|
| A | 0.75 | 0.10 | 0.15 |
| B | 0.75 | 0.05 | 0.20 |
| C | 0.95 | 0.03 | 0.02 |
| D | 0.95 | 0.05 | 0.00 |

The glass composition may be any one of the known glass compositions provided that it has a melting point ranging from 600° to 900° C. It is however preferred to use a glass composition of a system $BaO-SiO_2$. Typical glass composition of the $BaO-SiO_2$ system includes 10 to 40 wt. % BaO, 20 to 60 wt. % $SiO_2$, 1 to 25 wt. % $Li_2O$, 1 to 10 wt. % CaO, 1 to 10 wt. % SrO, 1 to 15 wt. % $Al_2O_3$ and 1 to 10 wt. % $TiO_2$.

The main component of the dielectric ceramic composition according to the present invention has been limited to those having a set of values for x, y and z falling within the polygon ABCD defined by points A, B, C and D in FIG. 1, for the following reasons. If the main component has a composition falling on a point out of the side AB of the polygon ABCD in the figure, the dielectric constant becomes less than 15000. If the main component has a composition falling on a point out of the side BC of the polygon ABCD, the sintering temperature becomes higher than 1000° C. If the main component have a composition falling on a point out of the side of CD of the polygon ABCD, the dielectric constant becomes less than 15000, and the sintering temperature becomes higher than 1000° C. If the main component has a composition falling on a point out of the side DA of the polygon ABCD, the dielectric loss factor becomes greater than 2.0%.

The glass composition is incorporated into the main component to improve resistance to plating as well as to lower the sintering temperature of the ceramics. During firing of the composition, the glass component melts and covers solid grains of the main component to form coatings on the grains. Since the grains of the main component is coated by the glass composition, the dielectric ceramic composition is prevented from redox reactions during electroplating, thus making it possible to prevent the growth of plated metal and deterioration of electrical characteristics of the capacitors produced.

However, if the added amount of the glass composition is less than 0.5 parts by weight per 100 parts by weight of the main component, no effect can be obtained. If the added amount of the glass component exceeds 1.5 parts by weight per 100 parts by weight of the main component, segregation takes place in the composition during firing, and causes abnormal grain growth in a part of the composition. For these reasons, the added amount of the glass composition has been limited to the above range.

The above and other objects, features and advantages of the present invention will become apparent from the following description with reference to examples and the accompanying drawing, in which FIG. 1 is a composition diagram of a ternary system $Pb(Mg_{\frac{1}{3}}Nb_{\frac{2}{3}})O_3$—$Pb(Cu_{\frac{1}{2}}W_{\frac{1}{2}})O_3$—$PbTiO_3$.

EXAMPLE

Using $Pb_3O_4$, $MgCO_3$, $Nb_2O_5$, CuO, $W_2O_3$ and $TiO_2$, as raw materials, there was prepared a main component of a 90.5 mol % $Pb(Mg_{\frac{1}{3}}Nb_{\frac{2}{3}})O_3$, 3 mol % $Pb(Cu_{\frac{1}{2}}W_{\frac{1}{2}})O_3$ and 6.5 mol % $PbTiO_3$ in the following manner: The raw materials were weighed, mixed in the above proportions, and milled by the wet process for 16 hours. After drying, the mixture was calcined at 950° C. for 2 hours, crushed and then ground to prepare calcined powder.

Separate from the above, using $BaCO_3$, $Li_2CO_3$, $CaCO_3$, $SrCO_3$, $Al_2O_3$, $TiO_2$ and $SiO_2$ as raw materials, there was prepared a glass composition in the following manner: The raw materials were weighed and mixed so that the product has a composition consisting of 18.82 wt. % BaO, 13.72 wt. % $Li_2O$, 5.19 wt. % CaO, 9.51 wt. % SrO, 1.96 wt. % $Al_2O_3$, 4.70 wt. % $TiO_2$ and 46.10 wt. % $SiO_2$. The mixture was milled by the wet process for 16 hours and then dried by evaporation. The resultant mixed powder was put into an alumina crucible, maintained at 1300° C. for 1 hour, vitrified by rapid cooling, and then ground to prepare powder of the glass composition having such particle size that particles may pass through a 200 mesh sieve screen.

The above calcined powder (100 parts by weight) was mixed with 6 parts by weight of polyvinyl butyral, 2.6 parts by weight of plasticizer, 1.0 parts by weight of the above $BaO$-$SiO_2$ glass composition, 3.3 parts by weight of toluene and 39.5 parts by weight of ethyl alcohol, formed into a green sheet by the Doctor blade method, dried and then cut to prepare green ceramic sheets.

The ceramic green sheets were provided on one flat surface with a conductive layer for an internal electrode by screen process printing a Ag-Pd alloy paste. Subsequently, 20 sheets of the printed green sheets were stacked, pressed and then cut to prepare green chips for multilayer capacitors. The resultant green chips were fired at a temperature ranging from 900° to 950° C. for 2 hours to prepare specimens.

The thus prepared specimen was then electro-plated with a Ni or Sn plating bath. No deposition of a metal was observed on the surface of the capacitor tip. For the capacitor tip, the measurements were made on relative dielectric constant ($\epsilon$), dielectric loss factor (tan $\delta$) and insulating resistance (IR). Results are as follows:

$\epsilon \geq 28000$ tan $\delta \leq 2.0\%$ log IR $\geq 10$

For comparison, there were prepared comparative specimens in the same manner as above, using the above calcined powder as a dielectric material. The sintering temperature of the ceramic composition consisting of 90.5 mol % $Pb(Mg_{\frac{1}{3}}Nb_{\frac{2}{3}})O_3$, 3 mol % $Pb(Cu_{\frac{1}{2}}W_{\frac{1}{2}})O_3$ and 6.5 mol % $PbTiO_3$ was 1000° to 1100° C. It was observed that a metal was deposited on the surface of the capacitor tips during electroplating. The electric characteristics of the comparative specimen are as follows:

$\epsilon \geq 20000$ tan $\delta \geq 5\%$ log IR $\leq 7$

From the above results, it will be seen that the incorporation of the glass composition into the specific main component lowers the sintering temperature, and prevents the capacitor chips from deposition of a metal during electroplating, thus making it possible to produce multilayer chip capacitors for surface mounting.

The dielectric composition according to the present invention can be fired at a temperature ranging from 900° to 950° C., thus making it possible to reduce energy required for its production. In addition, it is possible to use noble metal alloys with a low content of a noble metal, for example, Ag-Pd alloys having a Ag/Pd ratio ranging from 85:15 to 100:0, as a material for internal electrodes of multilayer ceramic capacitors. Further, the dielectric ceramic composition of the present invention has a high dielectric constant of about 28000, a low dielectric loss factor of not more than 2.0% and high resistance to electro-plating, thus making it possible to produce small-sized, high capacitance multilayer chip capacitors for surface mounting.

What is claimed is:

1. A dielectric ceramic composition consisting essentially of a main component of a ternary system $Pb(Mg_{\frac{1}{3}}Nb_{\frac{2}{3}})O_3$—$Pb(Cu_{\frac{1}{2}}W_{\frac{1}{2}})O_3$—$PbTiO_3$, and containing a glass composition of the $BaO$-$SiO_2$ system consisting essentially of 10 to 40 wt. % BaO, 20 to 60 wt. % $SiO_2$, 1 to 20 wt. % $Li_2O$, 1 to 10 wt. % CaO, 1 to 10 wt. % SrO, 1 to 15 wt. % $Al_2O_3$ and 1 to 10 wt. % $TiO_2$ with a melting point of 600° to 900° C. in an amount of 0.5 to 1.5 parts by weight per 100 parts by weight of said main component, said main component having a composition represented by the general formula:

$$xPb(Mg_{\frac{1}{3}}Nv_{\frac{2}{3}})O_3 - yPb(Cu_{\frac{1}{2}}W_{\frac{1}{2}})O_3 - zPbTiO_3$$

wherein x, y and z are mol fractions of respective components and have a set of values falling with a polygon ABCD defined by points A, B, C and D in FIG. 1, and $x+y+z=1.00$, the set of x, y and z at each said point being as follows:

|   | x | y | z |
|---|------|------|------|
| A | 0.75 | 0.10 | 0.15 |
| B | 0.75 | 0.05 | 0.20 |
| C | 0.95 | 0.03 | 0.02 |
| D | 0.95 | 0.05 | 0.00 |

* * * * *